(12) United States Patent
Tuck et al.

(10) Patent No.: US 10,108,424 B2
(45) Date of Patent: Oct. 23, 2018

(54) PROFILING CODE PORTIONS TO GENERATE TRANSLATIONS

(71) Applicant: NVIDIA Corporation, Santa Clara, CA (US)

(72) Inventors: Nathan Tuck, Corvallis, OR (US); Alexander Klaiber, Mountain View, CA (US); Ross Segelken, Portland, OR (US); David Dunn, Sammamish, WA (US); Ben Hertzberg, Santa Clara, CA (US); Rupert Brauch, Sunnyvale, CA (US); Thomas Kistler, Palo Alto, CA (US); Guillermo J. Rozas, Los Gatos, CA (US); Madhu Swarna, Portland, OR (US)

(73) Assignee: Nvidia Corporation, Santa Clara, CA (US)

( * ) Notice: Subject to any disclaimer, the term of this patent is extended or adjusted under 35 U.S.C. 154(b) by 297 days.

(21) Appl. No.: 13/828,865

(22) Filed: Mar. 14, 2013

(65) Prior Publication Data

US 2014/0281392 A1 Sep. 18, 2014

(51) Int. Cl.
*G06F 9/30* (2018.01)
*G06F 9/38* (2018.01)
*G06F 11/34* (2006.01)

(52) U.S. Cl.
CPC ...... *G06F 9/30145* (2013.01); *G06F 9/30174* (2013.01); *G06F 9/30189* (2013.01);
(Continued)

(58) Field of Classification Search
CPC ............. G06F 9/30174; G06F 11/3466; G06F 2201/86
See application file for complete search history.

(56) References Cited

U.S. PATENT DOCUMENTS 3,815,101 A 6/1974 Boss et al.
3,950,729 A 4/1976 Fletcher et al.
(Continued)

FOREIGN PATENT DOCUMENTS

CN 1390329 1/2003
CN 1519728 8/2004
(Continued)

OTHER PUBLICATIONS

Rozas, Guillermo J. et al., "Queued Instruction Re-Dispatch After Runahead," U.S. Appl. No. 13/730,407, filed Dec. 28, 2012, 36 pages.
(Continued)

*Primary Examiner* — Benjamin P Geib
*Assistant Examiner* — William V Nguyen

(57) ABSTRACT

The disclosure provides a micro-processing system operable in a hardware decoder mode and in a translation mode. In the hardware decoder mode, the hardware decoder receives and decodes non-native ISA instructions into native instructions for execution in a processing pipeline. In the translation mode, native translations of non-native ISA instructions are executed in the processing pipeline without using the hardware decoder. The system includes a code portion profile stored in hardware that changes dynamically in response to use of the hardware decoder to execute portions of non-native ISA code. The code portion profile is then used to dynamically form new native translations executable in the translation mode.

21 Claims, 5 Drawing Sheets

(52) U.S. Cl.
CPC ........ *G06F 9/3808* (2013.01); *G06F 11/3466* (2013.01); *G06F 11/3471* (2013.01); *G06F 2201/81* (2013.01); *G06F 2201/86* (2013.01); *G06F 2201/865* (2013.01); *G06F 2201/88* (2013.01)

(56) References Cited

U.S. PATENT DOCUMENTS

| | | | |
|---|---|---|---|
| 4,654,790 A | 3/1987 | Woffinden | |
| 4,797,814 A | 1/1989 | Brenza | |
| 4,812,981 A | 3/1989 | Chan et al. | |
| 5,123,094 A | 6/1992 | MacDougall | |
| 5,179,669 A | 1/1993 | Peters | |
| 5,245,702 A | 9/1993 | McIntyre et al. | |
| 5,278,962 A | 1/1994 | Masuda et al. | |
| 5,414,824 A | 5/1995 | Grochowski | |
| 5,446,854 A | 8/1995 | Khalidi et al. | |
| 5,487,146 A | 1/1996 | Guttag et al. | |
| 5,526,504 A | 6/1996 | Hsu et al. | |
| 5,649,102 A | 7/1997 | Yamauchi et al. | |
| 5,649,184 A | 7/1997 | Hayashi et al. | |
| 5,696,925 A | 12/1997 | Koh | |
| 5,721,855 A | 2/1998 | Hinton et al. | |
| 5,870,582 A | 2/1999 | Cheong et al. | |
| 5,949,785 A | 9/1999 | Beasley | |
| 5,956,753 A | 9/1999 | Glew et al. | |
| 5,963,984 A | 10/1999 | Garibay, Jr. et al. | |
| 5,974,543 A * | 10/1999 | Hilgendorf | G06F 9/3806 712/240 |
| 5,999,189 A | 12/1999 | Kajiya et al. | |
| 6,012,132 A | 1/2000 | Yamada et al. | |
| 6,031,992 A | 2/2000 | Cmelik et al. | |
| 6,091,897 A | 7/2000 | Yates et al. | |
| 6,091,987 A | 7/2000 | Thompson | |
| 6,118,724 A | 9/2000 | Higginbottom | |
| 6,297,832 B1 | 10/2001 | Mizuyabu et al. | |
| 6,298,390 B1 | 10/2001 | Matena et al. | |
| 6,362,826 B1 | 3/2002 | Doyle et al. | |
| 6,457,115 B1 | 9/2002 | McGrath | |
| 6,470,428 B1 | 10/2002 | Milway et al. | |
| 6,499,090 B1 | 12/2002 | Hill et al. | |
| 6,519,694 B2 | 2/2003 | Harris | |
| 6,549,997 B2 | 4/2003 | Kalyanasundharam | |
| 6,636,223 B1 | 10/2003 | Morein | |
| 6,658,538 B2 | 12/2003 | Arimilli et al. | |
| 6,711,667 B1 | 3/2004 | Ireton | |
| 6,714,904 B1 | 3/2004 | Torvalds et al. | |
| 6,742,104 B2 | 5/2004 | Chauvel et al. | |
| 6,751,583 B1 * | 6/2004 | Clarke et al. | 703/17 |
| 6,813,699 B1 | 11/2004 | Belgard | |
| 6,823,433 B1 | 11/2004 | Barnes et al. | |
| 6,839,813 B2 | 1/2005 | Chauvel | |
| 6,859,208 B1 | 2/2005 | White | |
| 6,877,077 B2 | 4/2005 | McGee et al. | |
| 6,883,079 B1 | 4/2005 | Priborsky | |
| 6,950,925 B1 | 9/2005 | Sander et al. | |
| 6,978,462 B1 * | 12/2005 | Adler et al. | 719/318 |
| 6,981,083 B2 | 12/2005 | Arimilli et al. | |
| 7,007,075 B1 | 2/2006 | Coffey | |
| 7,010,648 B2 | 3/2006 | Kadambi et al. | |
| 7,062,631 B1 | 6/2006 | Klaiber et al. | |
| 7,082,508 B2 | 7/2006 | Khan et al. | |
| 7,107,411 B2 | 9/2006 | Burton et al. | |
| 7,107,441 B2 | 9/2006 | Zimmer et al. | |
| 7,117,330 B1 | 10/2006 | Alverson et al. | |
| 7,120,715 B2 | 10/2006 | Chauvel et al. | |
| 7,124,327 B2 | 10/2006 | Bennett et al. | |
| 7,139,876 B2 | 11/2006 | Hooker | |
| 7,159,095 B2 | 1/2007 | Dale et al. | |
| 7,162,612 B2 | 1/2007 | Henry et al. | |
| 7,191,349 B2 | 3/2007 | Kaushik et al. | |
| 7,194,597 B2 | 3/2007 | Willis et al. | |
| 7,194,604 B2 | 3/2007 | Bigelow et al. | |
| 7,203,932 B1 | 4/2007 | Gaudet et al. | |
| 7,225,355 B2 | 5/2007 | Yamazaki et al. | |
| 7,234,038 B1 | 6/2007 | Durrant | |
| 7,275,246 B1 | 9/2007 | Yates, Jr. et al. | |
| 7,310,722 B2 | 12/2007 | Moy et al. | |
| 7,340,582 B2 | 3/2008 | Madukkarumukumana et al. | |
| 7,340,628 B2 | 3/2008 | Pessolano | |
| 7,401,358 B1 | 7/2008 | Christie et al. | |
| 7,406,585 B2 | 7/2008 | Rose et al. | |
| 7,447,869 B2 | 11/2008 | Kruger et al. | |
| 7,519,781 B1 | 4/2009 | Wilt | |
| 7,545,382 B1 | 6/2009 | Montrym et al. | |
| 7,685,365 B2 * | 3/2010 | Rajwar | G06F 9/467 711/118 |
| 7,702,843 B1 | 4/2010 | Chen et al. | |
| 7,730,489 B1 | 6/2010 | Duvur et al. | |
| 7,752,627 B2 | 7/2010 | Jones et al. | |
| 7,873,793 B1 | 1/2011 | Rozas et al. | |
| 7,890,735 B2 | 2/2011 | Tran | |
| 7,921,300 B2 | 4/2011 | Crispin et al. | |
| 7,925,923 B1 | 4/2011 | Hyser et al. | |
| 8,035,648 B1 | 10/2011 | Wloka et al. | |
| 8,190,863 B2 | 5/2012 | Fossum et al. | |
| 8,364,902 B2 | 1/2013 | Hooker et al. | |
| 8,533,437 B2 | 9/2013 | Henry et al. | |
| 8,549,504 B2 | 10/2013 | Breternitz, Jr. et al. | |
| 8,621,120 B2 | 12/2013 | Bender et al. | |
| 8,706,975 B1 | 4/2014 | Glasco et al. | |
| 8,707,011 B1 | 4/2014 | Glasco et al. | |
| 8,762,127 B2 | 6/2014 | Winkel et al. | |
| 9,384,001 B2 | 7/2016 | Hertzberg et al. | |
| 9,547,602 B2 | 1/2017 | Klaiber et al. | |
| 2001/0049818 A1 | 12/2001 | Banerjia et al. | |
| 2002/0004823 A1 | 1/2002 | Anderson et al. | |
| 2002/0013889 A1 | 1/2002 | Schuster et al. | |
| 2002/0099930 A1 * | 7/2002 | Sakamoto et al. | 712/227 |
| 2002/0108103 A1 | 8/2002 | Nevill | |
| 2002/0169938 A1 | 11/2002 | Scott et al. | |
| 2002/0172199 A1 | 11/2002 | Scott et al. | |
| 2003/0014609 A1 | 1/2003 | Kissell | |
| 2003/0018685 A1 | 1/2003 | Kalafatis et al. | |
| 2003/0033507 A1 | 2/2003 | McGrath | |
| 2003/0120892 A1 | 6/2003 | Hum et al. | |
| 2003/0140245 A1 | 7/2003 | Dahan et al. | |
| 2003/0167420 A1 | 9/2003 | Parsons | |
| 2003/0172220 A1 | 9/2003 | Hao | |
| 2003/0196066 A1 | 10/2003 | Mathews | |
| 2003/0236771 A1 | 12/2003 | Becker | |
| 2004/0025161 A1 | 2/2004 | Chauvel et al. | |
| 2004/0054833 A1 | 3/2004 | Seal et al. | |
| 2004/0078778 A1 | 4/2004 | Leymann et al. | |
| 2004/0122800 A1 | 6/2004 | Nair et al. | |
| 2004/0128448 A1 | 7/2004 | Stark et al. | |
| 2004/0153350 A1 | 8/2004 | Kim et al. | |
| 2004/0168042 A1 | 8/2004 | Lin | |
| 2004/0193831 A1 | 9/2004 | Moyer | |
| 2004/0215918 A1 | 10/2004 | Jacobs et al. | |
| 2004/0225869 A1 | 11/2004 | Pagni et al. | |
| 2004/0268071 A1 | 12/2004 | Khan et al. | |
| 2005/0050013 A1 | 3/2005 | Ferlitsch | |
| 2005/0055533 A1 | 3/2005 | Kadambi et al. | |
| 2005/0086650 A1 | 4/2005 | Yates, Jr. et al. | |
| 2005/0097276 A1 | 5/2005 | Lu et al. | |
| 2005/0097280 A1 | 5/2005 | Hofstee et al. | |
| 2005/0138332 A1 | 6/2005 | Kottapalli et al. | |
| 2005/0154831 A1 | 7/2005 | Steely, Jr. et al. | |
| 2005/0154867 A1 | 7/2005 | DeWitt, Jr. et al. | |
| 2005/0207257 A1 | 9/2005 | Skidmore | |
| 2005/0268067 A1 | 12/2005 | Lee et al. | |
| 2006/0004984 A1 | 1/2006 | Morris et al. | |
| 2006/0010309 A1 | 1/2006 | Chaudhry et al. | |
| 2006/0069879 A1 | 3/2006 | Inoue et al. | |
| 2006/0069899 A1 | 3/2006 | Schoinas et al. | |
| 2006/0095678 A1 | 5/2006 | Bigelow et al. | |
| 2006/0149931 A1 | 7/2006 | Haitham et al. | |
| 2006/0174228 A1 | 8/2006 | Radhakrishnan et al. | |
| 2006/0187945 A1 | 8/2006 | Andersen | |
| 2006/0190671 A1 | 8/2006 | Jeddeloh | |
| 2006/0195683 A1 | 8/2006 | Kissell | |
| 2006/0230223 A1 | 10/2006 | Kruger et al. | |
| 2006/0236074 A1 | 10/2006 | Williamson et al. | |

(56) References Cited

U.S. PATENT DOCUMENTS

| | | |
|---|---|---|
| 2006/0259732 A1 | 11/2006 | Traut et al. |
| 2006/0259744 A1 | 11/2006 | Matthes |
| 2006/0259825 A1 | 11/2006 | Cruickshank et al. |
| 2006/0277398 A1 | 12/2006 | Akkary et al. |
| 2006/0282645 A1 | 12/2006 | Tsien |
| 2006/0288174 A1 | 12/2006 | Nace et al. |
| 2007/0067505 A1 | 3/2007 | Kaniyur et al. |
| 2007/0073996 A1 | 3/2007 | Kruger et al. |
| 2007/0106874 A1 | 5/2007 | Pan et al. |
| 2007/0126756 A1 | 6/2007 | Glasco et al. |
| 2007/0157001 A1 | 7/2007 | Ritzau |
| 2007/0168634 A1 | 7/2007 | Morishita et al. |
| 2007/0168643 A1 | 7/2007 | Hummel et al. |
| 2007/0204137 A1 | 8/2007 | Tran |
| 2007/0234358 A1 | 10/2007 | Hattori et al. |
| 2007/0240141 A1 | 10/2007 | Qin et al. |
| 2008/0141011 A1 | 6/2008 | Zhang et al. |
| 2008/0172657 A1* | 7/2008 | Bensal et al. ............... 717/136 |
| 2008/0263284 A1 | 10/2008 | da Silva et al. |
| 2009/0019317 A1 | 1/2009 | Quach et al. |
| 2009/0204785 A1 | 8/2009 | Yates, Jr. et al. |
| 2009/0327661 A1 | 12/2009 | Sperber et al. |
| 2009/0327673 A1* | 12/2009 | Yoshimatsu .......... G06F 9/3806 712/240 |
| 2010/0017183 A1 | 1/2010 | Kenney |
| 2010/0161901 A9 | 6/2010 | Williamson et al. |
| 2010/0205402 A1 | 8/2010 | Henry et al. |
| 2010/0205415 A1 | 8/2010 | Henry et al. |
| 2010/0217936 A1 | 8/2010 | Carmichael et al. |
| 2010/0306503 A1 | 12/2010 | Henry et al. |
| 2011/0078425 A1 | 3/2011 | Shah et al. |
| 2011/0153307 A1* | 6/2011 | Winkel ................... G06F 9/455 703/26 |
| 2011/0238923 A1 | 9/2011 | Hooker et al. |
| 2011/0307876 A1* | 12/2011 | Ottoni ................. G06F 9/45525 717/153 |
| 2012/0023359 A1 | 1/2012 | Edmeades et al. |
| 2012/0089819 A1 | 4/2012 | Chaudhry et al. |
| 2012/0198157 A1 | 8/2012 | Abdallah |
| 2013/0198458 A1 | 8/2013 | Winkel et al. |
| 2013/0219370 A1 | 8/2013 | Beale et al. |
| 2013/0246709 A1 | 9/2013 | Segelken et al. |
| 2013/0275684 A1 | 10/2013 | Tuck et al. |
| 2013/0311752 A1 | 11/2013 | Brauch et al. |
| 2014/0019723 A1 | 1/2014 | Yamada et al. |
| 2014/0052962 A1 | 2/2014 | Hertzberg et al. |
| 2014/0082291 A1 | 3/2014 | Van Zoeren et al. |
| 2014/0136891 A1 | 5/2014 | Holmer et al. |
| 2014/0189310 A1 | 7/2014 | Tuck et al. |
| 2014/0281259 A1 | 9/2014 | Klaiber et al. |
| 2015/0026443 A1 | 1/2015 | Kumar et al. |

FOREIGN PATENT DOCUMENTS

| | | |
|---|---|---|
| CN | 1629799 | 6/2005 |
| CN | 1682181 | 10/2005 |
| CN | 101042670 | 9/2007 |
| CN | 101110074 | 1/2008 |
| CN | 100378618 C | 4/2008 |
| CN | 101984403 | 3/2011 |
| CN | 102110011 | 6/2011 |
| EP | 0671718 | 9/1995 |
| EP | 1557754 | 7/2005 |
| GB | 2287111 | 9/1995 |
| GB | 2404043 | 1/2005 |
| GB | 2404044 | 1/2005 |
| JP | 02288927 | 11/1990 |
| JP | 03054660 | 3/1991 |
| JP | 04182858 | 6/1992 |
| TW | I232372 | 5/2005 |
| TW | I309378 | 5/2009 |
| TW | I315846 | 10/2009 |
| TW | 201220183 | 5/2012 |
| TW | I425418 | 2/2014 |
| WO | 2012103209 | 8/2012 |

OTHER PUBLICATIONS

Adve, S. et al., "Shared Memory Consistency models: A Turorial", WRL Research Report 95/7, Western Digital Laboratory, Sep. 1995, 32 pages.

Chaudhuri, "The impact of NACKs in shared memory scientific applications", Feb. 2004, IEEE, IEEE Transactions on Parallel and distributed systems vol. 15, No. 2, p. 134-150.

Chaudry, S. et al., "High-Performance Throughput Computing," Micro, IEEE 25.3, pp. 32-45, May, 2005, 14 pages.

Dehnert et al., "The Transmeta Code MorphingTM Software: Using Speculation, Recovery, and Adaptive Retranslation to Address Real-Life Challenges," Mar. 23, 2003, IEEE, CGO '03 Proceedings of the International Symposium on Code generation and optimization: feedback-directed and runtime optimization, pp. 15-24.

Dundas, J. et al., "Improving Date Cache Performance by Pre-executing Instructions Under a Cache Miss", Proceedings of the 1997 International Conference on Supercomputing, Jul. 1997, 9 pages.

Ekman, M. et al., "Instruction Categorization for Runahead Operation", U.S. Appl. No. 13/708,544, filed Dec. 7, 2012, 32 Pages.

Ekman, M. et al., "Selective Poisoning of Data During Runahead", U.S. Appl. No. 13/662,171, filed Oct. 26, 2012, 33 pages.

Guelfi et al., (Rapid Integration of Software Engineering Techniques) 2005, Second International Workshop, 9 pages.

Harper et al., (Rapid recovery from transient Faults n The fault tolerant processor with fault-tolerant shared memory) 1990, IEEE, p. 350-359.

Holmer, B., et al., "Managing Potentially Invalid Results During Runahead", U.S. Appl. No. 13/677,085, filed Nov. 14, 2012, 29 pages.

Intel Itanium Architecture Software Developer's Manual, Intel, http://www.intel.com/design/itanium/manuals/iiasdmanual.htm, 1 page.

Laibinis, "Formal Development of Reactive Fault Tolerant Systems", Sep. 9, 2005, Springer, Second International Workshop, RISE 2005, p. 234-249.

Mutlu, O. et al. "Runahead Execution: An Alternative to Very large Instruction Windows for Out-of-order Processors," This paper appears in: "High-Performance Computer Architecture," Feb. 8-12, 2003, 13 pages.

Wikipedia, Physical Address, Apr. 17, 2010, pp. 1-2, www.wikipedia.com.

Ooi, (Fault Tolerant Architecture in a cache memory control LSI), 1992, IEEE, 507-514.

Oracle, (Oracle 8i Parallel server), 1999, Oracle, Release 2 (8.1.6) 1-216.

Osronline, (The Basics: So what is a Page fault?), http://www.osronline.com/article.cfm?article=222, May 5, 2003, p. 1-2.

PC Magazine (Definition of: Page Fault) PCMag.com, Mar. 27, 2009.

Rotenberg et al., "A Trace Cache Microarchitecture and Evaluation," IEEE Transactions on Computers, vol. 48, No. 2, Feb. 1999, 10 pages.

Rotenberg et al., "Trace Cache: a Low Latency Approach to High Bandwidth Instruction Fetching," Proceedings of th 29th Annual International Symposium on Microarchitecture, Dec. 2-4, 1996, Paris, France, IEEE, 12 pages.

Rotenberg et al., "Trace Cache: a Low Latency Approach to High Bandwidth Instruction Fetching," <http://people.engr.ncsu.edu/ericro/publications/techreport_MICRO-29_rbs.pdf>, Apr. 11, 1996, 48 pages.

Rozas, J. et al., "Lazy Runahead Operation for a Microprocessor", U.S. Appl. No. 13/708,645, filed Dec. 7, 2012, 32 pages.

Shalan, (Dynamic Memory Management for embedded real-time multiprocessor system on a chip), 2000, ACM, 180-186.

Shalan, (Dynamic Memory Management for embedded real-time multiprocessor system on a chip), 2003, Georgia Inst. of Tech. 1-118.

(56) References Cited

OTHER PUBLICATIONS

Wikipedia article, "Instruction Prefetch," https://en.wikipedia.org/wiki/Instruction_prefetch, downloaded May 23, 2016.
Wikipedia article, "x86," https://en.wikipedia.org/wiki/X86, downloaded May 23, 2016.
Wikipedia, (CPU Cache definition), Wikipedia, Jan. 26, 2010, pp. 1-16.
Wikipedia, (Page Fault definition), Wikipedia, Mar. 9, 2009, pp. 1-4.
Wikipedia, Memory Address, Oct. 29, 2010, pp. 1-4, www.wikipedia.com.

* cited by examiner

FIG. 3

226 → | BRANCH TARGET ADDRESS 226a | COUNT 226b |

FIG. 4

228 → | BRANCH TARGET ADDRESS 228a | SEQ INFO 228b | DIRECT / INDIRECT 228c | BRANCH TYPE 228d |

FIG. 5

244 → | BRANCH TARGET ADDRESS 244a | SEQ INFO 244b | DIRECT / INDIRECT 244c | BRANCH TYPE 244d | TLB 244e |

PROFILING CODE PORTIONS TO GENERATE TRANSLATIONS

BACKGROUND

Some micro-processing systems support the use of native translations of non-native ISA instructions. Typically these native translations cover several non-native instructions, perhaps even hundreds or thousands of non-native instructions. The native translations may employ various optimizations or other techniques to provide a performance benefit relative to that available through non-translated execution of the corresponding non-native ISA instructions. The performance benefit of an optimized native translation is proportional to the number of times the non-translated code would have been executed absent the translation. Since there is a performance overhead for creating the translation, it is desirable to target frequently-executed code so that the overhead can be amortized.

BRIEF DESCRIPTION OF THE DRAWINGS

FIGS. 3-5 depict examples of data records that may be recorded and processed in the micro-processing systems of FIGS. 1 and 2.

DETAILED DESCRIPTION

The present disclosure provides systems and methods that may be used to support creation of translations of portions of non-native ISA code. The example micro-processing systems herein may use a processing pipeline having an on-core hardware decoder (HWD) that receives and decodes non-native instructions into native instructions for execution. When the HWD is used in this manner, the disclosure will refer to this as the "hardware decoder mode" of execution.

The examples herein also may employ a "translation mode" of execution. In this mode, native translations are retrieved and executed without use of the HWD, for example by scheduling and dispatching the translations to one or more execution units. A native translation may cover and provide substantially equivalent functionality for any number of portions of corresponding non-native ISA code. The corresponding native translation is typically optimized to some extent relative to what would be achieved if the corresponding non-native code were to be executed using the HWD. A variety of optimizations and levels of optimization may be employed.

When the system is operating in the hardware decoder mode, the system may dynamically change and update a code portion profile in response to use of the HWD to execute portions of non-native ISA code. In certain embodiments, the code portion profile is stored in an on-core micro-architectural hardware structure, to enable rapid and lightweight profiling of code being processed with the HWD. The code portion profile may then be used in various ways to assist the process of dynamically forming new native translations.

In some examples, the code portion profile includes a plurality of records that are each associated with a portion of non-native ISA code that has been executed using the HWD. Records may be dynamically added as the code portions are processed by the HWD. From time to time, these records may be sampled and processed, for example by using software referred to herein as a "summarizer." The result is a summarized representation of code portion control flow involving the HWD, which may be used to guide formation of new native translations. In some examples, the summarized representation is reflected in a control flow graph. In any case, when appropriately employed, the systems and methods herein improve the process of identifying code portions that should be covered in new translations. In other words, any quantum of non-native ISA code may include portions that are poor candidates for translation, and portions that are good candidates for translation. The examples herein improve the process of identifying whether a code portion is a good candidate for translation, relative to other code portions that might be included in a translation.

Figure 1:
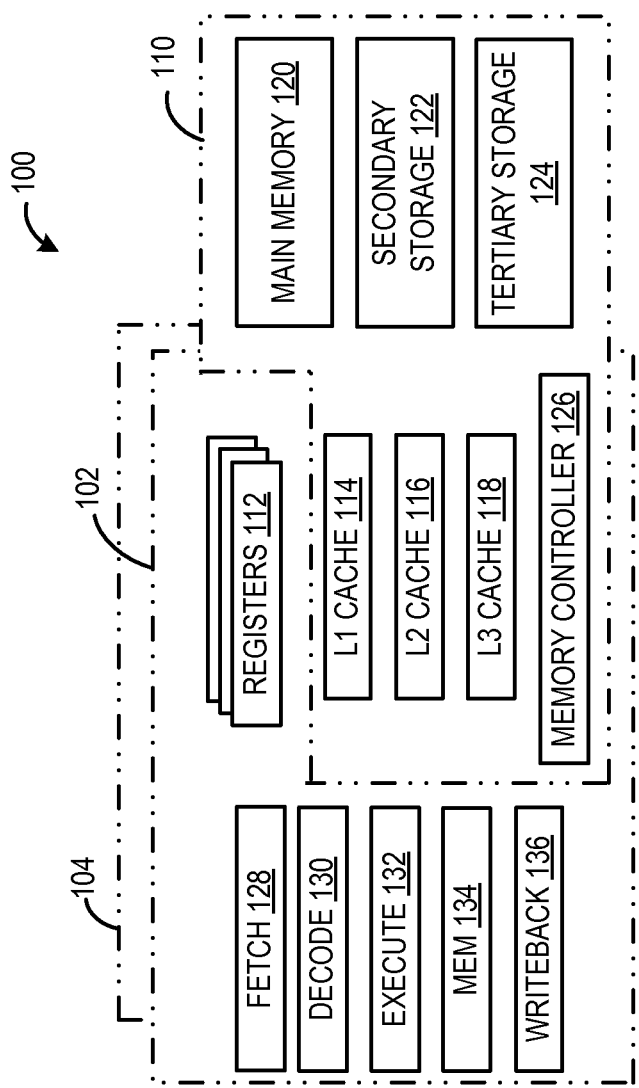
FIGS. 1 and 2 are schematic depictions of micro-processing systems according to the present description, in which code portion profiling can be employed to assist in forming native translations covering one or more non-native code portions.

FIG. 1 schematically depicts in simplified form a micro-processing system 100 which provides a suitable operating environment for the system and methods examples described herein. Microprocessor core/die 102 variously includes and/or may communicate with various memory and storage locations 110, which may include an L1 processor cache 114, an L2 processor cache 116, an L3 processor cache 118, main memory 120 (e.g., one or more DRAM chips), secondary storage 122 (e.g., magnetic and/or optical storage units) and/or tertiary storage 124 (e.g., a tape farm). Core 102 also includes a number of processor registers 112, which may include both general and special purpose registers. The L1-L3 caches may or may not be on the processor die/core, though in many cases at least the L1 cache will be on the processor core. It will be understood that the memory/storage components are listed above in increasing order of access time and capacity, though there are possible exceptions. A memory controller 126 may be used to handle the protocol and provide the signal interface required of main memory 120, and, typically, to schedule memory accesses. The memory controller can be implemented on the processor die or on a separate die. It is to be understood that the locations set forth above are non-limiting and that other memory/storage locations may be used without departing from the scope of this disclosure. As indicated, micro-processing system 100 may be implemented as a multi-core system, with one or more additional cores 104.

The microprocessor further includes a processing pipeline which typically includes one or more of fetch logic 128, HWD 130, execution logic 132, mem logic 134, and writeback logic 136. Fetch logic 128 retrieves instructions from one or more of locations 110 (but typically from either unified or dedicated L1 caches backed by L2-L3 caches and main memory).

When the system is in the above-referenced hardware decoder mode, HWD 130 decodes non-native ISA instructions, for example, by parsing opcodes, operands, and addressing modes. The outputs of the HWD are native instructions that are then executed by the execution logic. In the translation mode, native translations are retrieved and executed without needing to use the HWD. The native instructions output by the HWD will in some cases be referred to as non-translated instructions, to distinguish them from the native translations that are executed in the translation mode without use of the HWD. Native translations may be generated in a variety of ways. In some examples, a dynamic binary translator is employed to dynamically generate translations, though the present disclosure is applicable to other translation methods.

It should be understood that the above five stages are somewhat specific to, and included in, a typical RISC implementation. More generally, a microprocessor may include fetch, decode, and execution logic, with mem and writeback functionality being carried out by the execution logic. The present disclosure is equally applicable to these and other microprocessor implementations.

Figure 2:
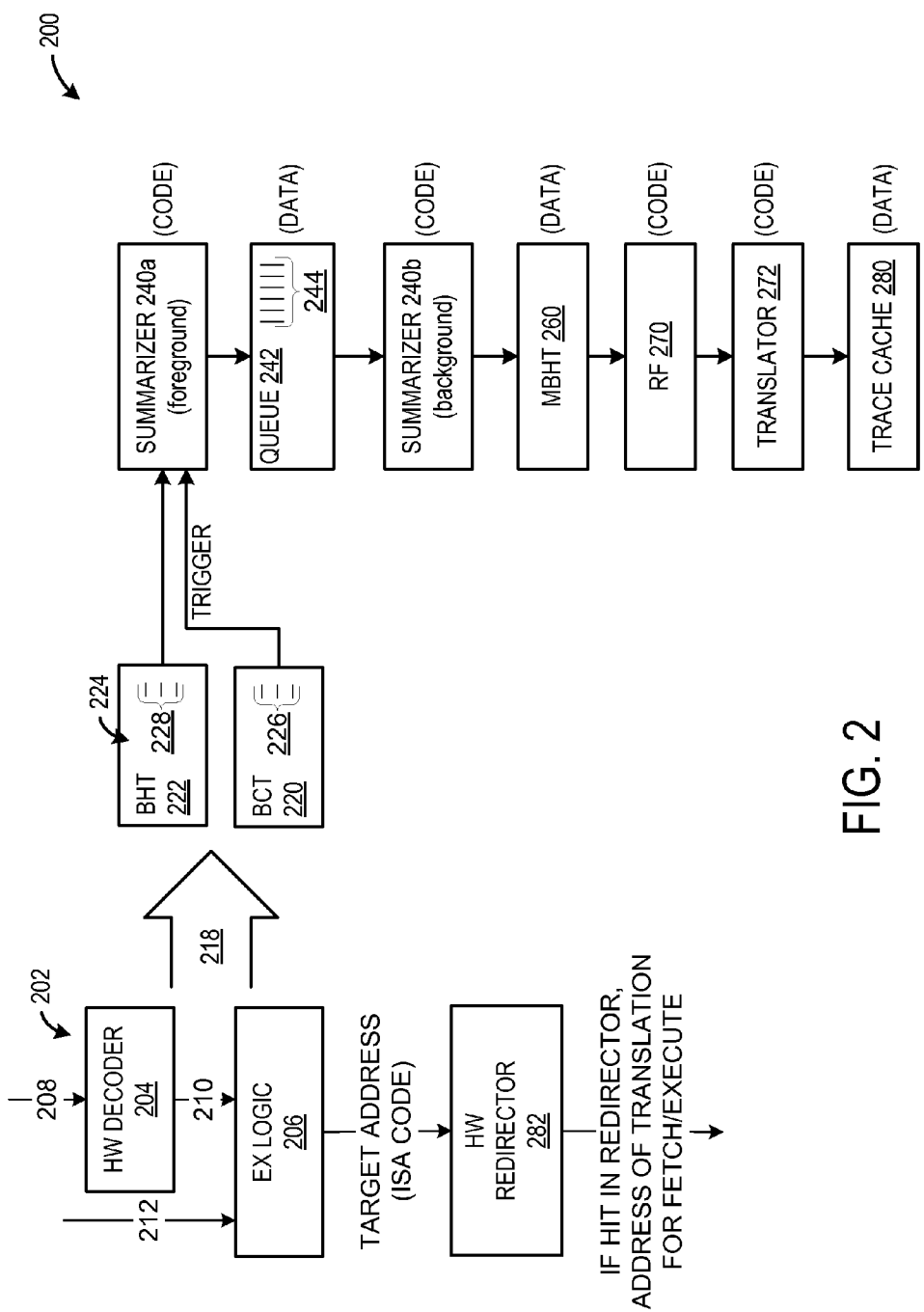

FIG. 2 schematically depicts in more detail a system 200 and associated method for profiling code portions in order to identify whether and how those code portions should be included in new translations. In the examples herein, profiled code portions are typically identified and defined by taken branches. This is but an example, however, and any suitable type of code portion or code portion definition may be used in connection with the systems and methods described herein. Among other things, an alternate implementation could also identify code portions in terms of not taken branches. Still further, characteristics and features other than branches may be used to identify and profile code portions for use in to-be-formed translations.

System 200 includes an on-core processing pipeline 202 including an HWD 204 and execution logic 206. In hardware decoder mode, non-native ISA instructions 208 are decoded by the HWD which in turn outputs non-translated native instructions 210 for execution by the execution logic. In translation mode, native translations 212 are retrieved from instruction memory and executed without using the HWD.

System 200 includes a branch count table 220 and a branch history table 222, both of which typically are implemented as micro-architectural hardware structures on a processor core or die (e.g., on the same core as HWD 204 and execution logic 206). The contents of the branch count table and the branch history table change as non-native code portions are processed by the HWD. Among other things, the branch history table may include a code portion profile 224 having information that changes dynamically as the HWD processes portions of non-native instructions. This code portion profile is used to form new native translations.

The branch count table and the branch history table each include a plurality of records (i.e., records 226 and 228). In both cases, the records contain information about non-native code portions encountered by HWD 204 as branch instructions are processed. In general, the branch count table tracks the number of times a branch target address is encountered, while the branch history table records information about the taken branch when a branch target address is encountered.

System 200 typically will include micro-architectural logic for adding and updating records in the branch count table and branch history table. This logic may be a distinct component or distributed within various of the example pipestages shown in FIGS. 1 and 2. In many cases, this logic will be operatively coupled closely with the HWD, since it is use of the HWD that results in changes to the branch count table and branch history table. Arrow 218 in general indicates that the operation of HWD 204 and execution logic 206 cause the records in the branch history table and branch count table to be populated, updated, etc.

FIG. 3 shows an example record 226 of the branch count table in more detail. The record includes a branch target address 226a. The branch target address identifies in some fashion a non-native code portion executed at least in part by the HWD as it processes and produces taken branches. In one example, the HWD processes a non-native portion of code that leads up and exits to a native translation corresponding to the branch target address. In another example, neither the branch instruction nor its target are part of a corresponding native translation. In still another example, the branch target address corresponds to a code portion that begins with an exit from a native translation. It will be appreciated in all three examples that the HWD is involved in some way, and it may therefore be desirable to collect information about such use of the HWD.

As shown in FIG. 3, the branch count table record may include a count 226b. As will be described in more detail, count 226b changes (e.g., increments or decrements) in response to the HWD encountering branch target address 226a. As explained in more detail below, an event may be taken when the counter saturates (underflows, overflows, etc.)

It should be understood that the record depicted in FIG. 3 is but one non-limiting example, and that numerous variations can be employed to track code execution using the hardware decoder. Instead of a single branch target address, a record may be used to count multiple target addresses. Partial addresses may also be employed. More generally, and as described elsewhere, the tracked code portions may be identified other than by branch targets.

FIG. 4 shows an example record 228 of branch history table 222. Similar to the branch count table, the record includes a branch target address 228a. Additional information in the record includes, for the branch producing the target, sequentially next instruction information 228b, an indication 228c of whether the branch is direct or indirect, and an indication 228d of the type of branch. This additional information will be described in detail below. Sequentially next instruction information 228b is used herein as an example of a mechanism for distinguishing the branch that produces the target; it will be appreciated that other mechanisms may be used to achieve this same end. As described below, information 228b may also be used to determine fall through paths, offsets and ordering of outbound edges in a control flow graph representation of code execution. As one alternate example, edge ordering and fall-through could be determined by using the address of the branch itself, along with additional bits to describe the length of the branch instruction. It will be appreciated, however, that other/different information may be observed in order to construct meaningful control flow representations. The specific information in record 228 is but one non-limiting example; a wide variety of other information may be captured about code portions for use in determining whether and how to incorporate those code portions into native translations.

The functions of the branch count table and branch history table are to collect information about the targets of taken branches where the HWD is somehow involved in the processing of the branch instruction. Accordingly, in some examples, records will not be recorded for target addresses that have or are part of a corresponding native translation, since execution in that circumstance typically will not involve the HWD, and there is thus no need, or less of a need, to profile execution since a translation already exists. For example if the system had a native translation for a non-translated portion of code starting at a given branch target address, then the system could be configured so that that branch target address does not have an associated record in the branch count table or the branch history table.

In some examples, the existence of a translation may be determined using an on-core hardware redirector 282, also known as a THASH. The hardware redirector is a microarchitectural structure that includes address information sufficient to allow the processing pipeline to retrieve and execute a translation associated with a non-native portion of code via address mapping. Specifically, when the processing pipe branches to a target address of a non-native portion of ISA code, the address is looked up in the hardware redirector. The address provided to the hardware redirector may be generated, as indicated, via a calculation performed by execution logic 206. In the event of a hit, the lookup returns the address of an associated translation, which is then fetched and executed in translation mode without the HWD. The THASH lookup may therefore act as a screen on whether to add/update records in the branch count table and branch history table. In particular, a THASH hit means that there is already a translation for the non-native target IP, and there is thus no need to profile hardware decoder execution of that portion of target code.

In any case, when the HWD first encounters a branch target address in the execution of a code portion, a record for the branch target address is added to the branch count table and an initial value is inserted into the count 226b. Alternatively, if a record already exists for the target address, the count 226b is incremented or decremented, as appropriate to the implementation. When a record is added to or updated in the branch count table, a record for that same branch target address is added to the branch history table 222.

In one example, the branch history table is implemented as a circular buffer. Each record contains attributes of taken branches as indicated above. When the buffer is full, subsequent writes simply erase the oldest entry, and a top-of-stack pointer wraps around. Again, it should be noted that records may be updated and inserted in one or more of the three following cases: (1) where the branch target address is an exit from a translation; (2) where the branch target address is an entrance into a translation; and (3) where the branch jumps from a non-translated portion (HWD mode) to another non-translated portion. Restated, in a system that defines code portions by branches, it may be of interest to profile branches from HWD mode to translation mode, and vice versa, as well as branches between non-translated portions of code (i.e., where the pipeline remains in HWD mode for both the source and target code portions.)

Referring again to FIG. 2, the example depicts various additional code and data associated with sampling and processing information from the branch history table in order to generate and refine native translations. To facilitate understanding, these components are labeled to differentiate code (e.g., processing routines) from the data produced or consumed by that code. In particular, summarizer 240a, summarizer 240b, region former 270 and translator 272 are code, while queue 242, MBHT 260 and trace cache 280 are data structures, as will be apparent from the discussion below.

Continuing with FIG. 2, summarization processes may be employed to sample and process records in the branch history table, in order to facilitate forming new native translations. As described below, it typically will be desirable to implement summarization activity into separate foreground and background processing threads. As used herein, foreground processing refers to operations responsible for making architectural forward progress on the non-native ISA instructions being emulated. Background threads, in contrast, may perform operations that are not directly relating to moving forward architecturally, and those threads may run on other cores. In general, the examples herein contemplate a lightweight foreground sampling of information about code executed using the hardware decoder, with that information being queued for eventual processing by a more computationally expensive background thread.

In the depicted example, the summarizer includes a foreground summarizer 240a which may be implemented as a lightweight event handler that is triggered when a record in the branch count table produces an event (e.g., the counter for the record saturates). In other words, branch count table 220 produces an event, and summarizer 240a handles the event. The counts maintained in the branch count table for a target address are used to control how many times the associated code portion will be encountered before an event is taken for that code portion. As described in more detail below, one of the summarizers may control the counter values for the records of the branch count table.

In the depicted example, foreground summarizer 240a handles the event by sampling one or more records 228 from the branch history table and placing information about those records in queue 242 for subsequent processing by background summarizer 240b. For example, if the branch count table triggers an event when an overflow occurs for a branch target, the foreground summarizer may then sample the corresponding record for that branch target that was added to the branch history table. In some cases, the foreground summarizer will also sample one or more adjacent entries in the branch history table. For example, the foreground summarizer may sample the immediately prior record in order to identify the code portion that branched into the portion beginning with the respective branch target address. The foreground summarizer may also sample the subsequent entry to identify control flow out of the portion.

In the depicted example, queue 242 contains records 244, and as shown in the example record 244 of FIG. 5, the queued records may include the same information recorded in the records of the branch history table, such as the branch target address 244a, sequentially next instruction information 244b, direct/indirect indication 244c, and indication 244d of the type of branch. In addition, the foreground summarizer may insert TLB information 244e. One of the end results of the summarization process is to identify non-translated code portions to be included in a new native translation. In the depicted example, the records in the branch count table and branch history table use linear addresses, and the TLB information enables conversion to a physical address, so that the system knows where to retrieve the instructions to be optimized.

To facilitate lightweight operation of the foreground sampling, the branch count table and branch history table typically will be implemented to allow fast reading and fast recognition of triggers from the branch count table. In one example, a streaming 64-bit read capability is provided to allow the foreground summarizer to quickly obtain the necessary information about branch history and queue it for subsequent processing, e.g., by the background summarizer. Generally, it will be desirable that the foreground summarizer be implemented so as to obtain the desired information from the branch history table while minimally impeding forward architectural progress.

Background summarizer 240b is implemented as a background processing thread that processes records 244 of queue 242. In some cases, it will be desirable to run the background summarizer on another core, for example core 104 of FIG. 1. The processing in the example is performed to generate and update a representation of control flow into, out of, and between non-native code portions processed by the HWD. This representation is identified in FIG. 2 as meta branch history table (MBHT) 260. Information about code portions and control flow may be represented in any suitable manner, data structure, etc. The information in the MBHT is consumed by region former 270, which is responsible for forming regions of code that will be processed to form new native translations. The actual process of translation is performed by software identified as translator 272. Once formed, translations may be stored in one or more locations. In the present example, translations are stored in trace cache 280. Translator 272 may employ various techniques in creating translations, including reordering instructions, renaming registers, consolidating instructions, etc.

In some cases it will be desirable to allocate a portion of system memory as secure and private, so that it is invisible to the user/ISA. Various data and software may run and be stored in the secure memory allocation. In some embodiments, for example, one or more of summarizers 240a and 240b, queue 242, MBHT 260, region former 270, translator 272 and trace cache 280 reside in and/or run from a private/secure portion of memory.

Figure 6:
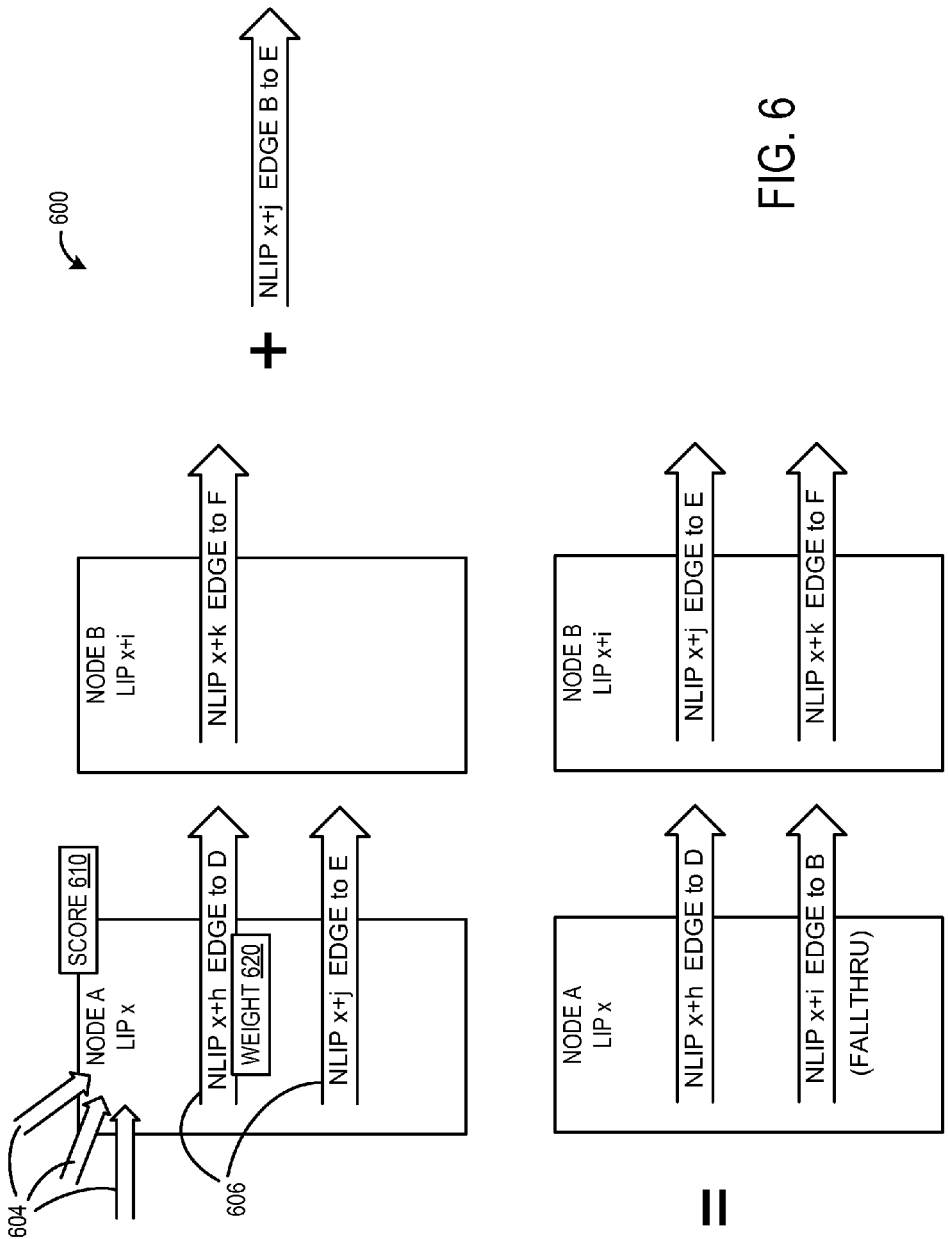
FIG. 6 depicts an example of a control flow representation of profiled code portions that may be employed to assist formation of native translations.

FIG. 6 depicts an example of how information about code portions and control flow among portions may be stored in MBHT 260, in the form of control flow graph 600. The depicted graph explicitly shows two example nodes 602 (Node A and Node B), and also shows how those nodes are updated when a new edge (Edge B to E) is introduced into the control flow graph representation. The example includes a number of edges, which represent control flow into, out of and between nodes. The example graph is a "superblock" representation in which there is a single entry point for each node and potentially multiple exit points. "Entry point" in the example refers to a branch target address that constitutes the starting point of the characterized portion. "Exit points" are offset from the entry point address by some amount, and represent branching out of the code portion to other branch targets.

Each node in the control flow graph corresponds to and contains information about a portion of non-native ISA code starting at a branch target address specified in one of the records that are processed from queue 242 (FIG. 2). Referring first to Node A in the upper left of the figure, the background summarizer constructs and updates the node through processing of the entries in queue 242 (FIG. 2). Node A specifically is a characterization/representation of a non-native ISA code portion that starts with the branch target address LIP x (linear address).

Each node may have multiple inbound edges 604 to its entry point. An edge into Node A is a result of two adjacent queued records processed from the BHT. Referring to the FIG. 5 example of a queued record, assume a record with branch target address LIP x-100 that immediately precedes a record having a branch target address LIP x, the branch target address of Node A. This defines an inbound edge to Node A from a node (not shown) having a starting address of LIP x-100. As execution continues over time, additional records with Node A's branch target address may be queued from the BHT for processing, and immediately prior queued records will result in additional edges into Node A as its branch target address is encountered repeatedly over time.

Each node may also have a number of exit points defined by the occurrence of outbound edges 606. As with inbound edges, outbound edges occur as a result of processing temporally adjacent records from the BHT. For example, Node A shows an outbound edge to Node D. Node D is not explicitly shown in the figure, but the node is present as a result of processing a BHT record for D's branch target address. Similarly, the figure implies but does not show Nodes E and F.

Continuing with the A-to-D edge, the outbound edge is added to Node A or updated when a processed BHT record for D immediately follows a processed BHT record for A, reflecting a taken branch from the portion of code associated with Node A to the portion of code associated with Node D. Similarly the outbound edge to E occurs or is updated as a result of adjacent records for A and E, reflecting control flow from the portion of code starting with A's target address to the portion of code starting with E's target address.

As shown in the example of Node A, each node in the control flow graph may be given a score 610. One component of the score is the number of times the node is encountered. As more records relating to Node A are processed, the score may be increased. This generally correlates with increased use of the HWD in connection with Node A's code portion, thus increasing the potential value of having the code portion be covered by a new native translation to shift processing away from the hardware decoder mode. In general, a higher score reflects the code portion being prioritized relatively higher for inclusion in a new native translation to be formed.

The score and prioritization for a node may also be based on the type of branch by which the node was entered. Referring back to FIGS. 4 and 5, the BHT records may include an encoding of the type of branch. Branch type may be encoded in any suitable manner. In the depicted example, as shown in fields 228c, 228d, 244c and 244d, encodings are used to indicate whether the branch is direct or indirect, whether the branch is a call or a return, and/or whether the branch is a transition, meaning a transition into or out of an existing native translation. These are but examples, encodings for other code portion types may be employed. Generally, any characteristic associated with a code portion that plays a role into whether or not it is desirable to translate the portion may be employed and factored into the score/priority of a node.

Branch type may play into the scoring heuristic in various ways. Tracking of calls and returns can facilitate tracking of nesting during the summarization process. This may help in avoiding cluttering the MBHT during the forming of or other processing relating to a native translation. In some cases, return targets may be scored/prioritized lower, even though they are indirect branches. In some cases this is because the native target typically is available on the hardware return stack and won't require a reference to hardware redirector 282. Call branches may correspond to frequently-called subroutines, and for this or other reasons it may be desirable to score nodes entered via calls higher.

Identifying whether or not the branch is a transition may be used to suppress creation of an edge in the MBHT. If the control flow is an exit from a native translation into the hardware decoder mode, there may not be any direct path from the previous BHT entry into the current entry. It might thus not be desirable, for purposes of profiling control flow between code portions processed by the HWD, to create an edge between nodes where an interposed native translation executes prior to entry into the second node.

As seen in FIGS. 4 and 5, the BHT records may also include sequentially next instruction information (228b in FIG. 4 and 244b in FIG. 5). In the example implementation, this information reflects the address of the instruction immediately following the instruction that produces the taken branch. Using the sequentially next instruction address may make it easier to connect fall through paths (the path if the branch is not taken), particularly in a setting with variable length instructions. If only the address of the branch instruction were employed, differences in the number of bytes per instruction would leave insufficient information to easily deduce the fall-through path resulting from the branch being not taken.

In one example, the sequentially next instruction information includes the full address of the next instruction after the branch instruction. In another example, the information includes only a portion of the next instruction address. Specifically, the least significant bits of the address of the next instruction may be included. These may then be combined with the high bits of the previous branch target to deduce the full address of the sequentially next instruction following the branch instruction. Using fewer bits in this manner may reduce the footprint of the BHT records and allow for faster queuing and processing of BHT records.

Knowledge of the fall-through path may be used in various ways. One use of the fall-through path is simply to have the path be clearly known so that the region former can retrieve instructions for the path that will be translated. Another use is to calculate the offset of each edge in the control flow graph. In particular, Node A in FIG. 6 shows edge offsets for the edge to Node D and the edge to Node E. FIG. 6 assumes h<i<j<k. The outbound edge to Node D is offset by h bytes from Node A's branch target address, and the outbound edge to Node E is offset by j bytes from A's branch target address. Knowledge of these offsets allows the outbound edges to be placed in their appropriate order relative to the entry address for the node.

As shown in the A-to-D edge, each outbound edge from a node may include a weight 620. Weight may be based on the number of times the associated branch is encountered and/or the number of times it is taken, or any other suitable metric. These edge weights provide a representation of control flow out of one code portion and into another, and the individual weighting may be used by the region former to form new native translations, and more specifically to decide what code paths to translate.

The previously-discussed ordering of edges facilitates determining edge weights by allowing a counting of the number of times an edge is encountered but not taken. For example, if the processed BHT records include an A-to-E edge, that would mean that the branch instruction associated with the A-to-D edge was encountered but not taken. If the processed records include an A-to-D edge, that would mean that the branch was encountered and taken. If the A-to-D edge is encountered and taken more frequently than the A-to-E edge, the A-to-D edge may be weighted more heavily than the A-to-E edge. The region former may use this information, for example, to preferentially form a translation starting with Node A that flows through to Node D, as opposed to a translation that flows from Node A to Node E.

In another example, assume that the A-to-D edge is encountered very frequently relative to other outbound edges, but is taken only half the time. In such a circumstance, the region former may operate to create a translation covering the taken path to Node D and the fall-through path.

FIG. 6 also illustrates how the system may reconcile a potential overlap between nodes when they share a common branch. BHT processing in the example produces a new B-to-E edge at Next Linear Instruction Pointer (NLIP) x+j. It will be understood that the NLIP designates the address of the instruction sequentially following the branch instruction. The NLIP at x+j implies an overlap between Nodes A and B due to a shared branch at fall-through address x+j. As shown at the bottom of the figure, this overlap may be resolved by updating Node A to include a fall-through edge to Node B at NLIP x+i and updating Node B to include an edge to E at NLIP x+j. The updated Node B also shows another example of edge ordering where the B-to-E edge precedes the B-to-F edge due to the respective NLIP offsets. Again, use of branch NLIP allows precise identification of the fall-through location in the presence of variable-length branch instructions.

Referring again to FIG. 2, foreground summarizer 240*a* and or background summarizer 240*b* may be used to control how and when branch count table 220 triggers events. One type of control includes control of the count maintained that determines when an event is taken (i.e., count 226*b* in FIG. 3). Initial count thresholds may be set when new target addresses are placed in the branch count table. In another example, thresholds may be increased for code portions that have already been profiled, in order to increase the likelihood of exposing and profile new code portions. The summarizer(s) may also control the branch count table to suppress the taking of an event for one or more portions that are being tracked in the branch count table.

Referring to FIGS. 3-5, it will be understood that the specific types of information in the records are non-limiting examples. For example, instead of information about the sequentially next instruction (FIGS. 4 and 5), the address of the branch itself could be used, combined with a few additional bits to describe the length of the instruction. More broadly, the present description encompasses those records containing any pertinent information about associated code portions that are executed at least in part with the hardware decoder, with an eye toward processing that information to generate a control flow representation to assist the forming of new translations.

Figure 7:
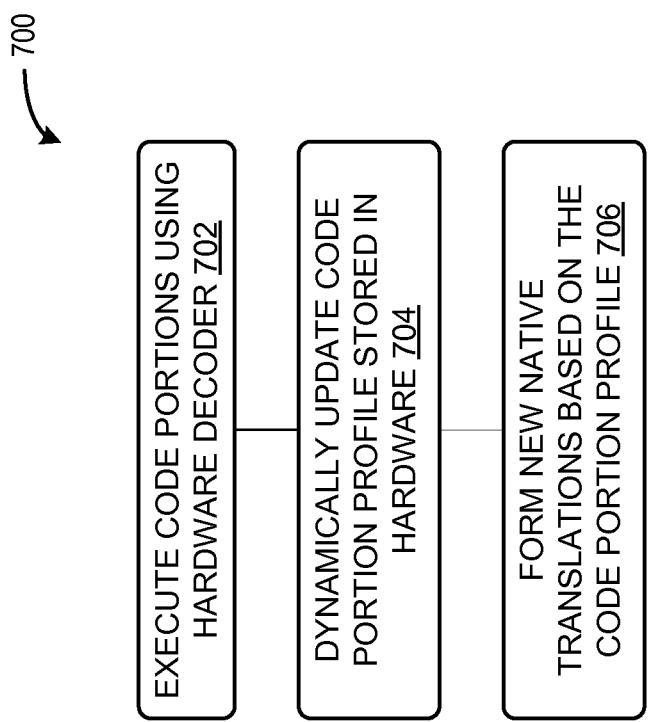
FIG. 7 depicts an example method of using code profiling to form native translations.

FIG. 7 shows a high-level example of a method 700 for profiling hardware decoder execution of code portions in order to form new translations. The method is employed in the context of a system that may operate in the above-described hardware decoder and translation modes of execution. The steps may be implemented as described above, though it should be understood that the method may be employed in connection with hardware/software configurations different than the examples discussed with reference to FIGS. 1 through 6 described above.

At 702 the method includes using a HWD to execute portions of code portions of a non-native ISA. The code portions may be defined and identified by branches (taken or not taken) as in the above examples or using any other suitable characteristic or definition. The goal in general is to characterize code portions executed in hardware decoder mode in order to identify optimal code portions for translation. In the depicted method, at 704, a code portion profile is stored in hardware, and is dynamically updated in response to and based on the use of the hardware decoder at step 702. At 706, the method then includes forming new native translations based on the code portion profile.

The code portion profile of step 702 may include a plurality of records, as described above. Each record may be associated with a code portion being executed using an HWD. These records may then be sampled and processed to generate a summarized representation of how those portions are being executed with the hardware decoder, and how program control flow links those code portions. The summarized representation may be generated using summarizing software, as in the above examples, and may take the form of a control flow graph, such as the graph described in connection with FIG. 6. As in the above examples, scoring and weighting may be used to prioritize code portions and inter-portion control flow, and new translations may be generated in accordance with those priorities.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware including the specific examples described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A micro-processing system with a processor core, comprising:
   a processing pipeline having a hardware decoder on the processor core, the processing pipeline being operable to enter a hardware decoder mode in which the hardware decoder receives and decodes non-native ISA instructions into native instructions for execution, and to enter a translation mode in which native translations of non-native ISA instructions are executed in the processing pipeline without using the hardware decoder;
   a code portion profile stored in a micro-architectural hardware structure on the processor core, the code portion profile including information corresponding to a plurality of portions of non-native ISA instructions executed with the hardware decoder, the information for each portion of the plurality of portions being based on a branch instruction executed with the hardware decoder and including an address of a next instruction that is to be executed when the branch instruction is not taken; and
   a summarizer configured to repeatedly sample the code portion profile and process the sampled information to generate a representation of how the plurality of portions of non-native ISA instructions have been executed,
   wherein the micro-processing system is operable to identify a portion of non-native ISA instructions from the plurality of portions for translation based on the information contained in the code portion profile, and to form a native translation of the portion of non-native ISA instructions identified for translation, the native translation being executable by the processing pipeline in the translation mode,
   wherein the representation comprises scores generated by the summarizer for the portions of non-native ISA instructions that have been executed, further wherein portions of non-native ISA instructions with relatively higher scores are prioritized relatively higher with respect to portions of non-native ISA instructions with relatively lower scores as a candidate for a native translation to be formed by the micro-processing system.

2. The system of claim 1, wherein the code portion profile includes a plurality of records that are dynamically added to the code portion profile during execution, each record containing information of a corresponding portion of non-native ISA instructions.

3. The system of claim 2, wherein each record in the code portion profile is associated with a branch instruction that has been executed for the associated portion of non-native ISA instructions.

4. The system of claim 1, wherein the micro-processing system is configured to identify the portion of non-native ISA instruction for translation based on the representation.

5. The system of claim 4, wherein the summarizer includes a foreground summarizer thread configured to sample the code portion profile, and a background summarizer thread configured to process the sampled information to generate the representation, and wherein the micro-processing system is configured to run the background summarizer thread on a different processor core than the foreground summarizer thread.

6. The system of claim 1, wherein scores for portions of non-native ISA instructions are based on a number of times those portions of non-native ISA instructions are encountered via use of the hardware decoder.

7. The system of claim 1, wherein scores for portions of non-native ISA instructions are based on a type of branch instruction associated with those portions of non-native ISA instructions.

8. The system of claim 1, further comprising a count table stored in a micro-architectural structure on the processor core and that contains, for at least some of the portions of non-native ISA instructions that have records in the code portion profile, a counter that tracks how many times that portion of non-native ISA instructions is encountered via use of the hardware decoder, and wherein saturation of the counter triggers operation of the summarizer to sample and process the information in the code portion profile pertaining to that portion of non-native ISA instructions.

9. The system of claim 1, wherein the summarizer is configured to repeatedly sample and process the information in the records to generate, for a given one of the portions of non-native ISA instructions, a representation of control flow from the portion of non-native ISA instructions out to a plurality of other portions of non-native ISA instructions, wherein the control flows to the other portions of non-native ISA instructions are individually weighted by the summarizer, and wherein such weighting is used by the micro-processing system to identify a portion of non-native ISA instructions to form a translation of the given portion of non-native ISA instructions.

10. The system of claim 1, wherein the information for each portion of the plurality of portions includes a target branch address.

11. The system of claim 10, wherein the micro-architectural hardware structure comprises a branch count table and a branch history table.

12. The system of claim 11, wherein the branch count table comprises information corresponding to count of encounters with a plurality of target addresses corresponding to the plurality of branch instructions, further wherein the branch history table comprises information corresponding to at least one of: a sequential next instruction, or a type of branch encountered for a branch instruction of the plurality of branch instructions.

13. The system of claim 1, wherein prior to identifying a portion of non-native ISA instructions for translation, the micro-processing system is operable to determine an existence of a translation for the identified portion of non-native ISA instructions.

14. The system of claim 13, wherein the micro-processing system is operable to determine the existence of the translation by using an on-core hardware director.

15. In a micro-processing system configured to operate in a hardware decoder mode, in which non-native ISA instructions are received and decoded by a hardware decoder into native instructions for execution, and in a translation mode in which native translations of non-native ISA instructions are executed natively without using the hardware decoder, a method of profiling execution of non-native ISA instructions to form new native translations, the method comprising:
- for each of a plurality of portions of non-native ISA instructions of a non-native ISA, executing at least a portion of the portion of non-native ISA instructions with the hardware decoder;
- dynamically updating a code portion profile stored in a micro-architectural hardware structure on a processor core of the micro-processing system in response to the executing at least the portion of the non-native ISA instructions with the hardware decoder, wherein dynamically updating the code portion profile includes adding records to the code portion profile, each record containing information about a portion of non-native ISA instructions that has been at least partially executed using the hardware decoder, the code portion profile including information based on a branch instruction executed with the hardware decoder and including an address of a next instruction that is to be executed when the branch instruction is not taken;
- sampling and processing the records in the code portion profile to assign scores to portions of non-native ISA instructions that have been at least partially executed using the hardware decoder;
- prioritizing portions of non-native ISA instructions as candidates for translation, wherein such prioritization is based on the scores for those portions of non-native ISA instructions; and
- forming native translations for portions of non-native ISA instructions identified from the plurality of portions based on the code portion profile, wherein the native translations are operable to be executed in the translation mode.

16. The method of claim 15, further comprising:
- sampling the code portion profile with a foreground summarizer thread;
- processing the sampled information with a background summarizer thread to generate a representation of how one or more portions of non-native ISA instructions have been executed using the hardware decoder; and
- dynamically forming a native translation based on the representation.

17. The method of claim 15, wherein scores for portions of non-native ISA instructions are increased based on how many times those portions of non-native ISA instructions are encountered via use of the hardware decoder.

18. The method of claim 15, wherein scores for portions of non-native ISA instructions are based on types of branch instructions associated with those portions of non-native ISA instructions.

19. The method of claim 15, further comprising:
- sampling and processing the records in the code portion profile to generate, for a given one of the portions of non-native ISA instructions, a representation of control flow from the portion of non-native ISA instructions out to a plurality of other portions of non-native ISA instructions;
- individually weighting the control flows out to the other portions of non-native ISA instructions; and
- using one or more of the individual weightings to form a translation covering the given portion of non-native ISA instructions.

20. A micro-processing system with a processor core, comprising:
- a processing pipeline having a hardware decoder on the processor core, the processing pipeline being operable to enter a hardware decoder mode in which the hardware decoder receives and decodes non-native ISA instructions into native instructions for execution, and to enter a translation mode in which native translations of non-native ISA instructions are executed in the processing pipeline without using the hardware decoder;
- a micro-architectural structure on the processor core and configured to store a plurality of records, each record being associated with and including information about a portion of non-native ISA instructions, wherein the information is based on a branch instruction executed with the hardware decoder and includes an address of a next instruction that is to be executed when the branch instruction is not taken;
- a summarizer configured to repeatedly sample and process the records to dynamically generate and update a representation of control flow into and between the portions of non-native ISA instructions,
- wherein for at least some of the portions of non-native ISA instructions, the representation includes a score for the portion of non-native ISA instructions which reflects relative prioritization of that portion of non-native ISA instructions for translation by the translator; and
- a translator configured to use the representation to dynamically form native translations of portions of non-native ISA instructions identified for translation based on information contained in the records corresponding to the identified portions of non-native ISA instructions, the native translations operable to be executed in the translation mode.

21. The system of claim 20, wherein for at least some of the portions of non-native ISA instructions, the representation includes an individual weighting of control flow out of the portion of non-native ISA instructions into each of a plurality of other portions of non-native ISA instructions, and wherein the individual weightings are used to form a new native translation that covers the portion of non-native ISA instructions.

* * * * *